United States Patent
Perrella (10) Patent No.: US 7,096,038 B1
(45) Date of Patent: Aug. 22, 2006

(54) WIRELESSLY COMMUNICATING DIGITAL PHOTOGRAPH IMAGE FILES

(75) Inventor: Ronald J. Perrella, Dunwoody, GA (US)

(73) Assignee: BellSouth IP Corporation, Wilmington, DE (US)

( * ) Notice: Subject to any disclaimer, the term of this patent is extended or adjusted under 35 U.S.C. 154(b) by 431 days.

(21) Appl. No.: 10/279,156

(22) Filed: Oct. 24, 2002

(51) Int. Cl.
*H04B 1/38* (2006.01)
*H04N 5/232* (2006.01)

(52) U.S. Cl. .................................. 455/557; 348/207.1

(58) Field of Classification Search ............ 348/211.99, 348/207.1, 148, 143, 153, 154; 358/1.13, 358/1.15; 375/240.01, 240.26, 240.1; 382/235; 709/206, 217, 246, 247; 719/328, 329; 455/414.1, 455/414.4, 412.1, 556.1, 557, 566, 550.1, 455/426.1, 454, 517, 186.1
See application file for complete search history.

(56) References Cited

U.S. PATENT DOCUMENTS

| | | | |
|---|---|---|---|
| 6,219,150 B1 * | 4/2001 | Eguchi | 358/1.15 |
| 6,745,024 B1 * | 6/2004 | DeJaco et al. | 709/206 |
| 6,906,818 B1 * | 6/2005 | Makishima | 455/420 |
| 2002/0102938 A1 * | 8/2002 | Tsubaki et al. | 455/3.06 |
| 2002/0140960 A1 * | 10/2002 | Ishikawa | 358/1.13 |
| 2002/0143883 A1 * | 10/2002 | Miyake et al. | 709/206 |
| 2004/0095236 A1 * | 5/2004 | Sobol | 340/506 |

* cited by examiner

*Primary Examiner*—Eliseo Ramos-Feliciano
(74) *Attorney, Agent, or Firm*—Lee & Hayes, PLLC (57) ABSTRACT

An apparatus is disclosed for wirelessly communicating a digital photograph image file. The image file may be divided into resulting files and the resulting files attached to e-mail messages that are wirelessly transmitted to a wireless network. Upon receipt of the wireless e-mail messages and resulting file attachments, the resulting files are recombined back into the image file.

11 Claims, 5 Drawing Sheets

Figure 5

WIRELESSLY COMMUNICATING DIGITAL PHOTOGRAPH IMAGE FILES

FIELD OF THE INVENTION

The invention generally relates to the field of computing. More particularly, the invention relates to wirelessly communicating digital photograph image files.

BACKGROUND OF THE INVENTION

Digital cameras are becoming increasingly popular—in fact, a recent study suggests that digital camera sales are currently reaching the same level as film camera sales. Early generations of digital cameras include a fixed storage device inside the camera for storing photographed images in digital image files. To retrieve the image files from the storage device, the camera is connected directly to a computer via cables so that the image files can be transferred to the computer. For example, to implement such a connection, a camera may include a serial port, a parallel port, a SCSI port, a USB port, and the like. Such a system of connecting the camera to the computer however, is inconvenient and often results in running out of storage space in the camera.

Newer digital cameras include removable storage devices for storing digital photograph image files. The removable storage devices typically are small, removable, solid-state flash-memory devices that have no moving parts. The removable storage devices can be physically removed from the camera and the image files on the storage device can be subsequently transferred to a computer or printer. This technique allows the user to have several removable storage devices, so that when one storage device becomes full, the user may insert another storage device in the camera. However, if a user desires to take a lot of photographs before transferring the image files to the computer, the user may have to purchase multiple removable storage devices, which may become expensive. Moreover, the transferring of the images from the removable storage devices to the computer is an additional manual user step, which may be inconvenient.

In view of the foregoing, there is a need for a method and system for a simpler way to transfer digital photograph image files to a computer.

SUMMARY

A method for wirelessly communicating a digital photograph image file comprises wirelessly receiving a plurality of files, each of the plurality of received files containing a portion of an image file and assembling the plurality of received files into the image file. The method may include receiving an identification of a destination for the image file and sending the assembled image file to the identified destination. The identification may comprise an e-mail address or a web page address. The plurality of files may each be attached to an e-mail message and each of the plurality of received files may have a corresponding indication of which portion of the image file the received file corresponds to, an indication of the image file, and an indication of a quantity of the plurality of received files.

A method for wirelessly communicating a digital photograph image file comprises receiving an image, converting the image to an image file that digitally represents the image, and wirelessly communicating the image file. The image file may be converted to a plurality of files wherein each of the plurality of files contains a portion of the image file that digitally represents the image. The image file may be communicated by creating a corresponding e-mail message for each of the plurality of files, and for each created e-mail message, attaching the corresponding file to the e-mail message and wirelessly communicating the e-mail message and the corresponding attached file. The image file may be converted to a plurality of files by converting the image to a compressed image file and dividing the compressed image file into a plurality of files, each of the plurality of files containing a portion of the compressed image file and having a size equal to or less than a predetermined file size. The predetermined file size may be based on at least one of a maximum file size that can be wirelessly transmitted on a wireless network and a maximum file size that can be attached to an e-mail message.

An apparatus for wirelessly communicating a digital photograph image file comprises a digital camera that is operable to create a compressed image file, a processor that is operable to convert the compressed image file to a plurality of files, each of the plurality of files containing a portion of the compressed image file, and a wireless transmitter that is operable to wirelessly communicate each of the plurality of files.

An apparatus for wirelessly communicating a digital photograph image file comprises a first portion and a second portion. The first portion comprises a data store and a processor in communication with the data store. The processor is operable to create a compressed image file and store the compressed image file on the data store. The second portion comprises a processor that is operable to receive the compressed image file from the data store of the first portion and operable to convert the compressed image file to a plurality of files, each of the plurality of files containing a portion of the compressed image file and a wireless transmitter in communication with the processor that is operable to wirelessly communicate each of the plurality of files.

A system for wirelessly communicating a digital photograph image file comprises a wireless e-mail server that is operable to wirelessly receive a plurality of files, each of the plurality of received files attached to an e-mail message and each of the plurality of received files containing a portion of an image file, operable to assemble the plurality of received files into the image file, operable to determine a destination address from at least one of the e-mail messages, and operable to send the image file to the determined destination address.

The above-listed features, as well as other features, of the disclosed apparatus, system, and method will be more fully set forth hereinafter.

BRIEF DESCRIPTION OF THE DRAWINGS

Illustrative embodiments of apparatus, systems, and methods for wirelessly communicating a digital photograph image file are further described in the detailed description that follows, by reference to the noted drawings, in which like reference numerals represent similar parts throughout the drawings, and wherein.

DETAILED DESCRIPTION OF ILLUSTRATIVE EMBODIMENTS

An apparatus is disclosed for wirelessly communicating a digital photograph image file. The image file may be divided into resulting files and the resulting files attached to e-mail messages that are wirelessly transmitted to a wireless network. Upon receipt of the wireless e-mail messages and resulting file attachments, the resulting files are recombined back into the image file.

Figure 1:
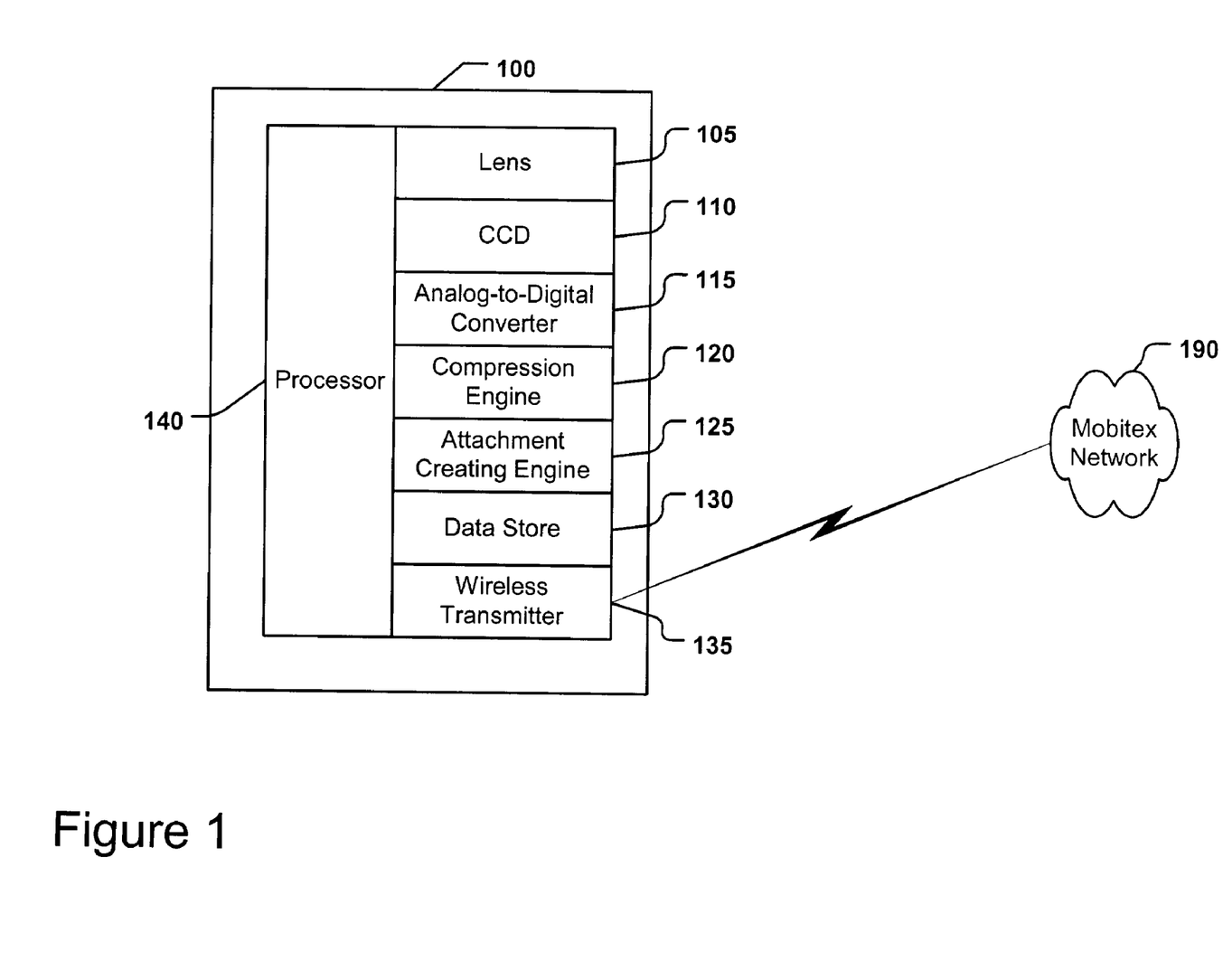
FIG. 1 is a diagram of an illustrative apparatus for wireless communication of a digital photograph image file.

FIG. 1 shows an illustrative apparatus for wirelessly communicating a digital photograph image file. Apparatus 100 comprises a camera lens 105, a charge coupled device (CCD) 110, an analog-to-digital converter 115, a compression engine 120, an attachment creating engine 125, a data store 130, a wireless transmitter 135, and a processor 140. Apparatus 100 communicates the image file to a wireless communication network, such as, for example, Mobitex network 190.

Mobitex is a wireless network architecture that specifies a framework for fixed equipment to support wireless terminals in a packet-switched, radio-based communication system. Three major components of a Mobitex network are a radio base station, a switch, and a network management center (each not shown). While the wireless communication network is shown as a Mobitex network 190, the wireless communication network may be any wireless communication network.

Returning to apparatus 100, camera lens 105 focuses incoming light from an image onto charge coupled device 110. Camera lens 105 may be any appropriate camera lens.

Charge coupled device 110 converts the light received from camera lens 105 to an electrical signal. Charge coupled device 110 typically is a collection of light-sensitive diodes, called photosites, that convert photons (i.e., light) into electrons for creating an electrical charge. Each photosite is sensitive to light such that the brighter the light that hits a particular photosite, the greater the electrical charge that accumulates at that photosite. Alternatively, charge coupled device 110 may be replaced with complementary metal oxide semiconductor (CMOS) technology or any other technology that converts from light to an electrical signal.

Analog-to-digital converter 115 converts the electrical signal of charge coupled device 110 to a digital signal. Analog-to-digital converter 115 may be any appropriate analog-to-digital converter.

Processor 140 converts the digital signal to an image file. For example, processor 140 may convert the digital signal to a bitmap formatted file of the image received at camera lens 105. A bitmap defines a display space and a color for each bit or pixel in the display space. A bitmap may contain a bit of color-coded information for each pixel or the bitmap may only contain information indicating a new color while scanning along a row of pixels in the display space. In either event, a bitmap image file of a digital photograph is typically a large file.

To reduce the file size, compression engine 120 compresses the bitmap image file into a compressed image file. The compressed image file may be a Graphics Interchange Format (GIF) formatted file, a Joint Photographic Experts Group (JPEG) formatted file, or the like. A GIF formatted file is a graphic image file that uses a two-dimensional raster data type and is encoded in binary. A JPEG formatted file is a graphic image file created by choosing from a plurality of compression algorithms. Since the highest quality results in the largest file, JPEG formatted files have a trade-off between image quality and file size. GIF formatted files and JPEG formatted files are supported on the Internet, usually with the file suffix of ".gif" and "jpg," respectively.

Attachment creating engine 125 divides the compressed image file into a plurality of files each containing a portion of the compressed image file for wireless communication over Mobitex network 190 as e-mail message attachments. The division of the compressed image file into resulting files may be based on the capabilities of a wireless communication network, the capabilities of a wireless e-mail messaging device, or the like. To explain further, a wireless communication network may have a size limit on transmission of a file through the network and a wireless e-mail messaging device may have a size limit on the size of a file that can be attached to an e-mail message. Attachment creating engine 125 divides the compressed image file into resulting image files that are not larger than the minimum size limit. Attachment creating engine 125 stores the resulting files in data store 130 for subsequent attachment to an e-mail message.

The resulting files are stored in data store 130, which may be any device capable of storing data files, such as, for example, a hard drive, a memory, a flash memory, and the like.

The e-mail messages and attachments are transmitted by wireless transmitter 135, which may be any device capable of wirelessly transmitting e-mail messages and attachments over a wireless communication network.

Processor 140 coordinates camera lens 105, charge coupled device 110, analog-to-digital converter 115, compression engine 120, attachment creating engine 125, data store 130, and wireless transmitter 135 to wirelessly communicate digital image files. Processor 140 typically executes program code to implement compression engine 120 and attachment creating engine 125.

Figure 2:
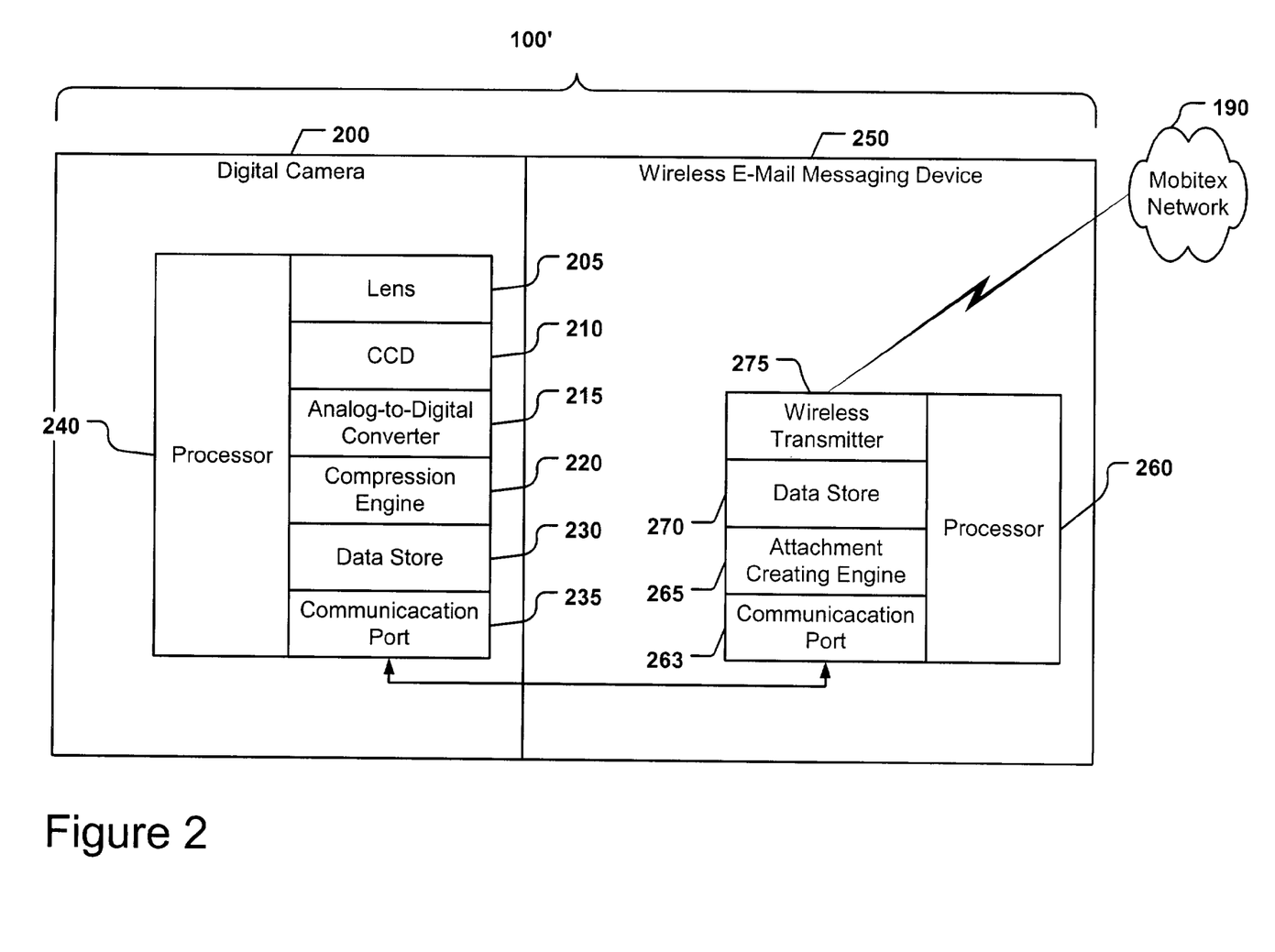
FIG. 2 is a diagram of another illustrative apparatus for wireless communication of a digital photograph image file.

FIG. 2 shows another illustrative apparatus for wirelessly communicating a digital photograph image file. Apparatus 100' comprises a digital camera 200 and a wireless e-mail messaging device 250. In this illustrative embodiment, apparatus 100' comprises two portions. The first portion is digital camera 200 that is commercially available from a variety of companies, such as, for example, Hewlett Packard Company, Palo Alto, Calif. The second portion is wireless e-mail messaging device 250 that is based on a wireless e-mail messaging device commercially available from BellSouth Incorporated, Atlanta, Ga. and other such messaging devices.

Digital camera 200 comprises a camera lens 205, a charge coupled device 210, an analog-to-digital converter 215, a compression engine 220, a data store 230, a communication port 235, and a processor 240. Camera lens 205 focuses incoming light from an image onto charge coupled device 210. Charge coupled device 210 converts the light received from camera lens 205 to an electrical signal. Analog-to-digital converter 215 converts the electrical signal to a digital signal and processor 240 converts the digital signal to an image file. Compression engine 220 compresses the image file to a compressed image file. Processor 240 coordinates camera lens 205, charge coupled device 210, analog-to-digital converter 215, compression engine 220, data store 230, and communication port 235. Processor 240 typically executes program code to implement compression engine 220.

Communication port 235 provides a port for communication of a digital photograph image file to wireless e-mail messaging device 250. Communication port 235 may be a serial port, a parallel port, a SCSI port, a USB port, and the like.

Wireless e-mail messaging device 250 may read a compressed image file from data store 230 via communication port 235. Wireless e-mail messaging device 250 may divide the compressed image file and wirelessly transmit the resulting files as e-mail message attachments. In this manner, a conventional digital camera may be combined with wireless e-mail messaging device 250 to provide the functionality of wirelessly communicating a digital image file.

Wireless e-mail messaging device 250 comprises a processor 260, a communication port 263, an attachment creating engine 265, a data store 270, and a wireless transmitter 275.

Communication port 263 provides a port for communication of a compressed image file from digital camera 200. Communication port 263 may be a serial port, a parallel port, a SCSI port, a USB port, and the like, as long as communication port 263 can communicate appropriately with communication port 235.

Attachment creating engine 265 divides the compressed image file into a plurality of files each containing a portion of the compressed image file for wireless communication over a wireless communication network. The division may be based on the limitations of a commercial wireless e-mail messaging device. That is, some commercially available wireless e-mail messaging devices use Multi-Purpose Internet Mail Extensions (MIME) to attach data files to e-mail messages. MIME is an extension of Simple Mail Transport Protocol (SMTP) that allows different kinds of data files to be communicated over the Internet, such as, for example, image files, audio files, video files, application programs, and the like. Some of the commercially available wireless e-mail messaging devices have a size limit on an e-mail attachment. For example, some commercially available wireless e-mail messaging devices have a size limit of 16 kilobytes on an e-mail attachment. To be compatible with such commercially available wireless e-mail messaging devices, attachment creating engine 265 may divide the compressed image file into resulting files having a size of 16 kilobytes or less.

The resulting files are stored in data store 270, which may be any device capable of storing data files, such as, for example, a hard drive, a memory, a flash memory, and the like.

The e-mail messages and attachments are transmitted by wireless transmitter 275, which may be any device capable of wirelessly transmitting e-mail messages and attachments over a wireless communication network.

Processor 260 coordinates communication port 263, attachment creating engine 265, data store 270, and wireless transmitter 275 to wirelessly communicate image files. Processor 260 typically executes program code to implement attachment creating engine 265.

Rather than attaching wireless e-mail messaging device 250 to a digital camera, digital camera 200 and wireless e-mail messaging device 250 may be combined in a single package. In such a case, processor 240 and processor 260 may communicate over a bus, rather than via communication ports. If, however, digital camera 200 and e-mail messaging device 250 include communication ports, digital camera 200 and e-mail messaging device 250 may be removably connected such that digital cameral 200 may function as a conventional digital camera and may function to wirelessly communication digital image files when e-mail messaging device 250 is connected to digital camera 200.

Also, digital camera 200 may be combined with a cellular telephone, a pager, or other wireless device to implement wireless communication.

Figure 3:
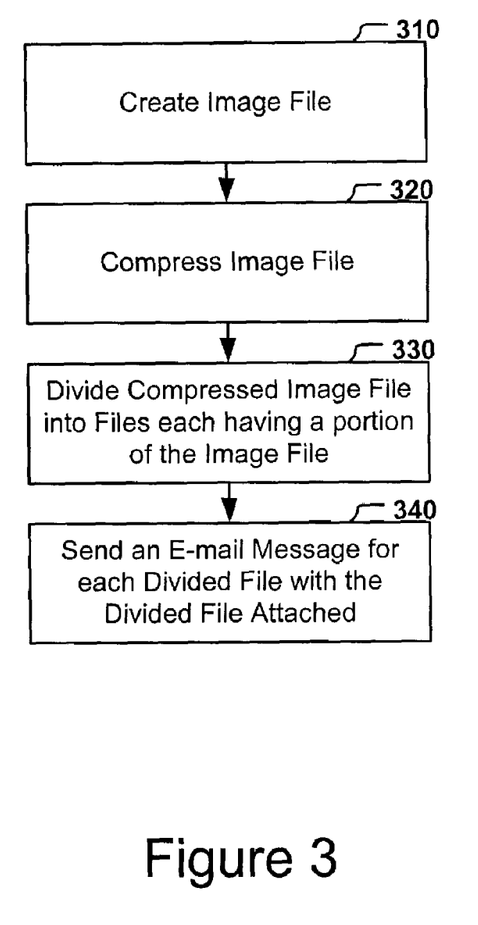
FIG. 3 is a flow diagram of an illustrative method for wireless communication of a digital photograph image file.

FIG. 3 is a diagram of an illustrative method for wireless communication of a digital photograph image file. While the method is described in connection with apparatus 100 of FIG. 1, the method may also be employed with apparatus 100' of FIG. 2 or other such apparatus. In the following description in connection with FIG. 3, an illustrative photograph is taken that generates a compressed image JPEG formatted file of 48 kilobytes and there is a size limitation of 16 kilobytes for an e-mail attachment. It should be noted that such parameters are used for illustrative purposes.

At step 310, processor 140 creates an image file based on light received through lens 105, as described above.

At step 320, compression engine 120 compresses the image file into a compressed image JPEG formatted file, for example, named "image.jpg."

At step 330, attachment creating engine 125 divides the compressed image file into a plurality of files, each containing a portion of the compressed image file and having a predetermined size or a size smaller than the predetermined size. Attachment creating engine 125 stores the resulting plurality of files to data store 130. For example, if compressed image file "image.jpg" is 48 kilobytes and a maximum e-mail attachment size is 16 kilobytes, attachment creating engine 125 divides "image.jpg" into three files, each for attachment to an e-mail message. In particular, attachment creating engine 125 may read the first 16 kilobyte portion of "image.jpg" and save those 16 kilobytes as a first file containing the first portion of "image.jpg." Attachment creating engine 125 may name the first file, for example, "image1of3.jpg." Attachment creating engine 125 may read the second 16 kilobyte portion of "image.jpg" and save those 16 kilobytes as a second file containing the second portion of "image.jpg." Attachment creating engine 125 may name the second file, for example, "image2of3.jpg." Attachment creating engine 125 may read the third 16 kilobyte portion of "image.jpg" and save those 16 kilobytes as a third file containing the third of "image.jpg." Attachment creating engine 125 may name the third file, for example, "image3of3.jpg."

As can be seen, the resulting image files are named such that they may be appropriately recombined after communication over the wireless communication network. That is, the filename includes an indication of a digital image file that the resulting file is associated with. For example, the illustrative filename above includes "image," indicating that the file is associated with compressed image file "image.jpg." The filename also includes an indication of the total number of resulting files associated with the image file. For example, the illustrative filename above includes "of3," indicating that there are three resulting image files associated with compressed image file "image.jpg." The filename also includes an indication of which portion of the compressed image file the resulting file corresponds to. For example the illustrative filename above includes "2 of," indicating that the resulting file is associated with second portion of compressed image file "image.jpg." Alternatively, such indications may be located in a header within the resulting file or in other appropriate locations.

At step 340, processor 240 causes wireless transmitter 135 to send an e-mail message for each resulting file created at step 330, with the resulting file attached to the e-mail message. For example, wireless transmitter 135 may send a first e-mail message having an attached resulting file named "image1of3.jpg" and continue sending e-mail messages with such attachments until all of the resulting files have been sent.

Figure 4:
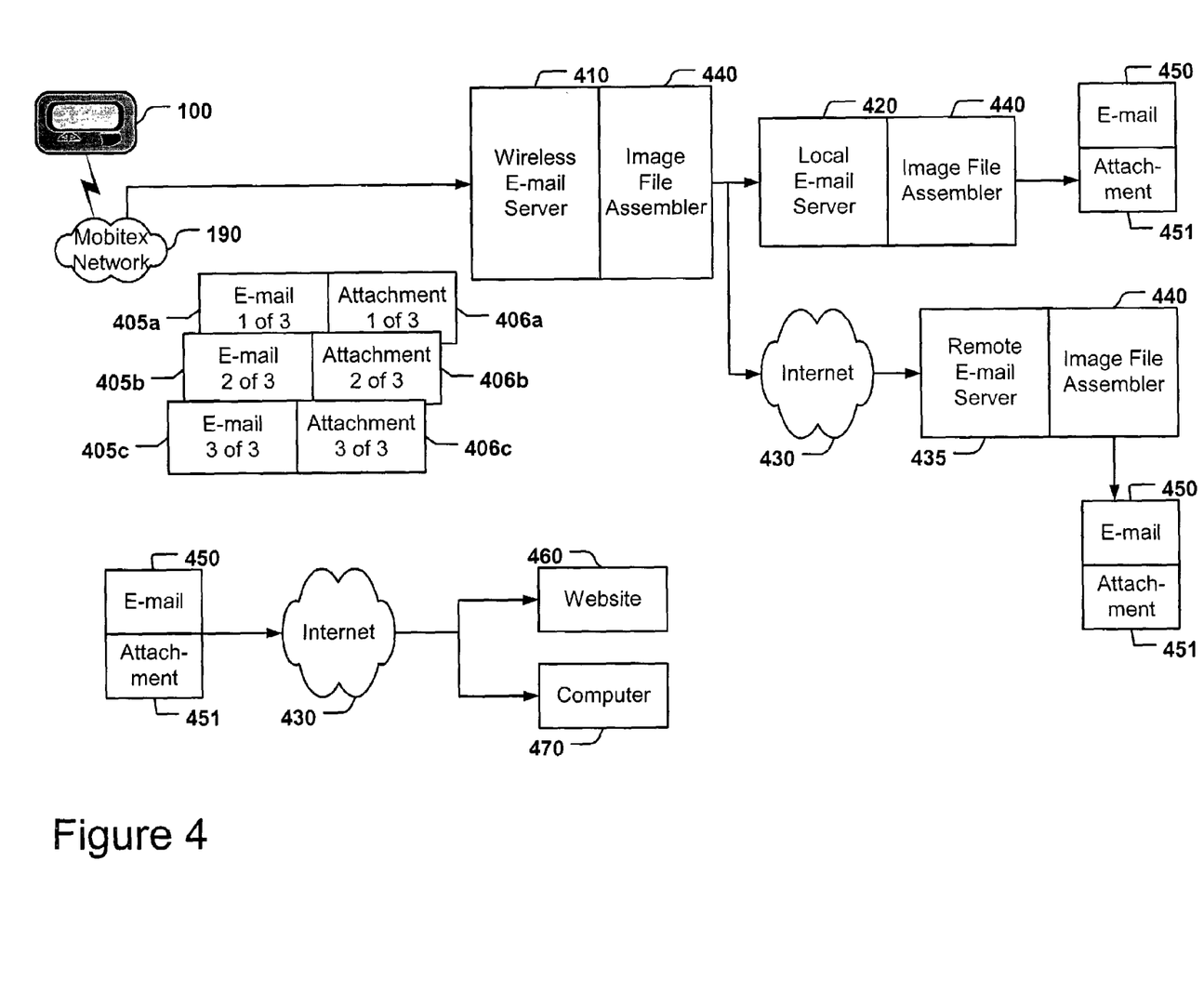
FIG. 4 is a diagram of an illustrative system for wireless communication of a digital photograph image file.

After the e-mail messages and resulting image file attachments are sent, a receiving device receives and recombines the resulting image files back into a compressed image file. FIG. 4 shows an illustrative system for such receipt and recombination of resulting image files into a compressed image file. As shown in FIG. 4, apparatus 100 communicates e-mail messages 405 having resulting image files as attachments 406 to a wireless e-mail server 410 (via Mobitex network 190). Wireless e-mail server 410 receives the e-mail messages 405 and attachments 406 from Mobitex network 190. Server 410 may be a server executing e-mail messaging software commercially available from Research In Motion, Limited, Waterloo, Ontario.

Server 410 includes an image file assembler 440 that assembles the received resulting image files back into a compressed image file. To continue with the illustrative compressed image file described above, apparatus 100 sends three e-mail messages 405a, 405b, and 405c to server 410. Each of the e-mail messages 405 includes an attachment 406a, 406b, and 406c, respectively. For example, e-mail message 405a may include as an attachment 406a, a resulting image file named "image1 of 3.jpg," e-mail message 405b may include as an attachment 406b, a resulting image file named "image2 of3.jpg," and an e-mail message 405c may include as an attachment a resulting image file named "image3 of3.jpg." Image file assembler 440 may recombine the received files into a compressed image file based on the filename, as described in more detail below.

Wireless e-mail server 410 communicates with other servers, such as, local e-mail server 420 which may be a server executing e-mail messaging software from Microsoft, Incorporated, Redmond, Wash. Such a local e-mail server may communicate with multiple computers (each not shown) via a local area network (LAN), a wide area network (WAN), an intranet, and the like (each not shown). With such communication between wireless e-mail server 410 and local e-mail server 420, image files may be communicated to computers (not shown) that are local to wireless e-mail server 410.

Wireless e-mail server 410 also communicates with remote e-mail server 435 via the Internet 430. Remote e-mail server 435 may communicate with multiple computers (each not shown) via a LAN, a WAN, an intranet, the Internet 430, and the like (each not shown). With such communication between wireless e-mail server 410 and remote e-mail server 435, image files may be communicated to computers (not shown) that are remote from wireless e-mail server 410.

Local e-mail server 420 and remote e-mail server 435 may each include an image file assembler 440. Such implementation may typically be utilized when wireless e-mail server 410 does not include an image file assembler 440. Regardless of where image file assembler 440 is located, image file assembler 440 receives the resulting image files via e-mail messages 405 and attachments 406 and combines the resulting image files into a compressed image file. The compressed image file may then be sent to a website 460 or a computer 470 as an attachment 451 to an e-mail 450.

A variety of techniques may be used to route the assembled compressed image file to website 460 or computer 470, as described in more detail below. Before describing the techniques for routing the compressed image file to a destination, a description of an e-mail message is provided.

An e-mail message includes a plurality of fields that may contain data. A destination field (e.g., a "To" field) may contain an address of a destination for the e-mail message. An origination field (e.g., a "From" field) may contain an address of an origination location for the e-mail message. A subject field may contain a text description of a subject of the e-mail message and a message field may contain a text message of the e-mail message.

Figure 5:
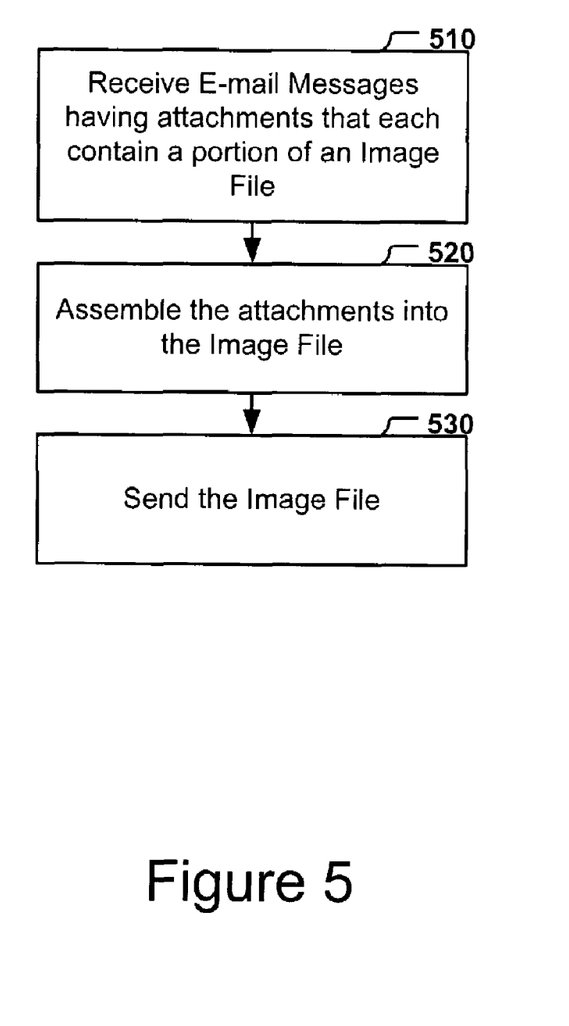
FIG. 5 is a flow diagram of another illustrative method for wireless communication of a digital photograph image file.

Returning now to assembling and routing the compressed image file, FIG. 5 is a diagram of an illustrative method for receiving and assembling resulting image files back into a compressed image file and routing the compressed image file. The illustrative resulting image files described in connection with FIG. 3 are again used here in connection with FIG. 5 for illustrative purposes.

At step 510, e-mail messages are received, each e-mail message having a file that contains a portion of a compressed image file as an attachment. For example, wireless e-mail server 410 may receive three files named "image1of3.jpg," "image2 of3.jpg," and "image3of3.jpg," respectively. Each of the three files is received as an attachment 406 to an e-mail message 405.

At step 520, image file assembler 440 assembles the received files into a compressed image file. Image file assembler 440 determines related e-mail messages by analyzing the filenames of the attachments. Each filename may include an indication of the compressed image file that the received file is associated with. For example, a filename may include "image" to indicate that the file is associated with the compressed image file named "image.jpg." Image file assembler 440 may determine the compressed image file by reading the filename of the received file and parsing "image" from the filename to determine that the received file is associated with the compressed image file named "image.jpg." Image file assembler 440 may also determine related e-mail messages by analyzing the indication of the origination of the e-mail message in the origination field (i.e., to distinguish between two sources sending a compressed image file with the same name).

Image file assembler 440 determines the quantity of related files by analyzing the filenames of the attachments. Each filename may include an indication of the quantity of associated files. For example, a filename including "of3" may indicate that there are three associated image files. Image file assembler 440 may determine the quantity of associate files by reading the filename of the received file and parsing "of3" from the filename to determine that there are three files associated with the compressed image file named "image.jpg."

Image file assembler 440 determines the sequencing of related files by analyzing the filenames of the attachments. Each filename may include an indication of which sequential portion of the compressed image file the file corresponds to. For example, a filename including "2of" indicates that the file corresponds to the second sequential portion of the associated compressed image file. Image file assembler 440 may determine which sequential portion of the compressed image file the file corresponds to by reading the filename of the received file and parsing "2of" from the filename to determine that the file is the second sequential file associated with the compressed image file named "image.jpg."

Image file assembler 440 assembles the received files into a compressed image file based on an indication of the compressed image file that the file is associated with, an indication of the quantity of associated received files, and the indication of which sequential portion of the compressed image file the file corresponds to. For example, image file assembler 440 may receive the three illustrative files described above and parse the filenames to determine an indication of the compressed image file that the file is associated with, an indication of the quantity of associated received files, and the indication of which sequential portion of the compressed image file the file corresponds to. That is, image file assembler 440 determines that there are three image files associated with the compressed image file "image.jpg," as described above. Image file assembler 440 also determines the sequential ordering of the received files, as described above. Image file assembler 440 reads the contents of first file "image1of3.jpg" and saves the contents to compressed image file "image.jpg." Image file assembler 440 then reads the contents of second image file "image2of3.jpg," and appends the contents to compressed image file "image.jpg." Image file assembler 440 then reads the contents of third image file "image3of3.jpg," and appends the contents to compressed image file "image.jpg." Image file assembler 440 continues reading the contents from received files, in an appropriate order, until all files have been read and appended to the compressed image file. Such assembly may be performed at image file assembler 440 of server 410, 420, or 435.

Alternatively, information related to reassembling the image file may be stored in the other portions of the e-mail message and attachment. For example, the indication of the compressed image file that the received file is associated with, an indication of the quantity of related received files, and the indication of which sequential portion of the compressed image file the received file corresponds to may be contained in fields of the e-mail message, such as, for example, the subject field, the message field, in a header portion of each file, and the like.

At step 530, the compressed image file is sent to a destination as an attachment to an e-mail message. Because the e-mail message is not being sent over a wireless communication network, the attachment size is not as limited in size and the compressed image file may be sent as a single attachment to the e-mail message. Wireless e-mail server 410 determines a destination address from e-mail message 405 to determine where to send the compressed image file. The destination address may be located in the destination field of the e-mail message. In this case, wireless e-mail server 410 reads the destination address from the destination field and creates an e-mail message 450 addressed to the destination address. Wireless e-mail server 410 attaches the compressed image file to e-mail message 450 as an attachment 451. Wireless e-mail server 410 sends e-mail message 450 and attachment 451 to the destination address. For example, if the destination address indicates that the destination is computer 470, wireless e-mail server 410 sends e-mail message 450 and attachment 451 to computer 470.

The destination of the compressed image file may further include an indication of a web page to which to send the compressed image file. The indication of the web page may be located in the subject field of the e-mail message, the message field of the e-mail message, or the like. If the e-mail message includes an indication of a web page, wireless e-mail server 410 sends e-mail message 450 and attachment 451 to website 460.

Website 460 receives the e-mail message 450 and attachment 451 and reads the indication of the web page. Website 460 then writes attachment 451 (i.e., the compressed image file) to the indicate web page.

To illustrate some of the uses of the apparatus, systems, and methods described herein, an insurance adjuster may use apparatus 100 to document a damaged automobile. The adjuster may take a digital photograph of the automobile and immediately send the digital image to their work e-mail address (e.g., "employee@insuranceco.com"). Also, a photographer may take a digital photograph of a horse and immediately send the digital image to a web page. For example, the digital image may be addressed to "www.photoman.com" and the subject field of the e-mail may contain "horse.html" to indicate to store the digital image on web page horse.html.

Program code (i.e., instructions) for performing the above-described methods may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the above-described processes. When implemented on a general-purpose processor, the program code combines with the processor to provide a unique apparatus that operates analogously to specific logic circuits.

It is noted that the foregoing description has been provided merely for the purpose of explanation and is not to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. An apparatus for wirelessly communicating a digital photograph image file, the apparatus comprising:
  a first portion, comprising:
    a data store;
    a first processor in communication with the data store, the first processor being operable to create a compressed image file and store the compressed image file on the data store; and
    a first communication port;
  a second portion, comprising:
    a second processor that is operable to receive the compressed image file from the data store of the first portion and operable to convert the compressed image file to a plurality of files, each of the plurality of files containing a portion of the compressed image file; and
    a wireless transmitter in communication with the second processor that is operable to wirelessly communicate each of the plurality of files;

and
a second communication port, the first and second communications ports in communication via a bus;
wherein the first portion and the second portion are removably connected via the bus.

2. The apparatus as recited in claim 1, wherein the first processor of the first portion and the second processor of the second portion are in communication via the bus.

3. The apparatus as recited in claim 1, wherein the wireless transmitter is operable to communicate with a Mobitex network.

4. The apparatus as recited in claim 1, wherein the first portion comprises a digital camera.

5. The apparatus as recited in claim 4, the first portion further comprising a camera lens, a charge coupled device for converting light received from the camera lens to an electrical signal, and an analog-to-digital converter for converting the electrical signal to a digital signal.

6. The apparatus as recited in claim 1, wherein the second portion comprises a wireless e-mail messaging device.

7. The apparatus as recited in claim 1, wherein the data store comprises at least one of a hard drive and flash memory.

8. The apparatus as recited in 1, wherein the first and second communications ports each comprise one of a parallel port, a serial port, and a USB port.

9. A system for wirelessly communicating a digital photograph image file comprising:
the apparatus of claim 1; and
a wireless e-mail server operable to wirelessly receive the plurality of files communicated by the wireless transmitter of the apparatus.

10. The system as recited in claim 9, wherein the wireless e-mail server comprises an image file assembler for recombining the plurality of files into a compressed image file.

11. The system as recited in claim 10, further comprising a local e-mail server in communication with the wireless e-mail server, that is operable to receive image files having a corresponding destination address that is associated with the local e-mail server.

* * * * *